(12) United States Patent
Tobe et al.

(10) Patent No.: US 10,030,560 B2
(45) Date of Patent: Jul. 24, 2018

(54) EXHAUST PURIFICATION DEVICE (71) Applicant: HINO MOTORS, LTD., Hino-shi (JP)

(72) Inventors: Kuniharu Tobe, Hino (JP); Hirofumi Tongu, Hino (JP); Tomoyuki Tsuruta, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 15/100,670

(22) PCT Filed: Dec. 17, 2014

(86) PCT No.: PCT/JP2014/083390
§ 371 (c)(1),
(2) Date: Jun. 1, 2016

(87) PCT Pub. No.: WO2015/093521
PCT Pub. Date: Jun. 25, 2015

(65) Prior Publication Data
US 2016/0305296 A1  Oct. 20, 2016

(30) Foreign Application Priority Data
Dec. 18, 2013 (JP) ................................. 2013-261440

(51) Int. Cl.
*F01N 3/28* (2006.01)
*F01N 3/20* (2006.01)
(Continued)

(52) U.S. Cl.
CPC ............. *F01N 3/206* (2013.01); *F01N 3/021* (2013.01); *F01N 3/106* (2013.01); *F01N 3/2066* (2013.01);
(Continued)

(58) Field of Classification Search
None
See application file for complete search history.

(56) References Cited

U.S. PATENT DOCUMENTS

| 2009/0094964 A1* | 4/2009 | Fujita | F01N 3/035 60/297 |
| 2015/0020484 A1* | 1/2015 | Kimura | B01F 5/0065 55/459.1 |

FOREIGN PATENT DOCUMENTS

| CN | 101408123 A | 4/2009 |
| JP | 2009-150337 A | 7/2009 |

(Continued)

OTHER PUBLICATIONS

Hiroaki et al. JP 2009150338-translated document (2009).*
(Continued)

*Primary Examiner* — Walter D. Griffin
*Assistant Examiner* — Jelitza M Perez
(74) *Attorney, Agent, or Firm* — Oblon, McClelland, Maier & Neustadt, L.L.P.

(57) ABSTRACT

An exhaust purification device for purifying exhaust gas flowing in an exhaust gas flow passage of an engine includes: a cylindrical casing; a pipe that is disposed on a downstream side of the casing and inserted in the casing so as to extend in a direction substantially orthogonal to an axial direction of the casing, the pipe being provided with a through-hole communicating with the casing; and an injector configured to inject a reducing agent from an upstream end of the pipe into the pipe, in which a contracting flow passage portion narrowing in an axial direction of the pipe from an upstream side toward the downstream side is formed in the exhaust gas flow passage in the casing.

10 Claims, 9 Drawing Sheets

(51) Int. Cl.
   *F01N 3/10*      (2006.01)
   *F01N 13/00*     (2010.01)
   *F01N 3/021*     (2006.01)

(52) U.S. Cl.
   CPC ......... *F01N 3/2892* (2013.01); *F01N 13/009* (2014.06); *F01N 13/0097* (2014.06); *F01N 2240/20* (2013.01); *F01N 2610/02* (2013.01); *Y02T 10/24* (2013.01)

(56) References Cited

FOREIGN PATENT DOCUMENTS

| JP | 2009150338 A | * | 7/2009 | | |
|---|---|---|---|---|---|
| JP | 2009-228484 A | | 10/2009 | | |
| JP | 2010-31717 A | | 2/2010 | | |
| JP | 2011-33011 A | | 2/2011 | | |
| JP | 2011033011 A | * | 2/2011 | | |
| JP | 2011033011 A | * | 2/2011 | | |
| JP | 2011-99415 A | | 5/2011 | | |
| JP | 2013-142368 A | | 7/2013 | | |
| JP | 2013142368 A | * | 7/2013 | ............ | B01F 5/0065 |
| JP | 2013142368 A | * | 7/2013 | ............ | B01F 5/0065 |
| WO | 2013/099404 A1 | | 7/2013 | | |
| WO | 2013/105336 A1 | | 7/2013 | | |

OTHER PUBLICATIONS

Hiroaki, F. JP 2011033011 A-translated document (2011).*
Hiroaki, F. (JP2011-033011A)-translated document (Year: 2011).*
International Preliminary Report on Patentability and Written Opinion dated Jun. 30, 2016 in PCT/JP2014/083390 (submitting English translation only).
International Search Report dated Mar. 24, 2015 in PCT/JP2014/083390 Filed Dec. 17, 2014.
Office Action dated Aug. 22, 2017 in Chinese Patent Application No. 201480060954.X.
Search Report dated Sep. 1, 2017 in European Patent Application No. 14873089.8.

* cited by examiner

EXHAUST PURIFICATION DEVICE

TECHNICAL FIELD

The present invention relates to an exhaust purification device.

BACKGROUND ART

As an exhaust purification device for purifying exhaust gas flowing in an exhaust gas flow passage of an engine, an exhaust purification device described in Patent Literature 1 has heretofore been known. The exhaust purification device described in Patent Literature 1 includes a first casing in which a diesel oxidation catalyst (DOC) and a diesel particulate filter (DPF) are accommodated, a pipe to which an injection nozzle (injector) for injecting urea water (reducing agent) into exhaust gas is attached, and a second casing in which a selective catalytic reducer (SCR) is accommodated. The pipe is inserted in the first casing so as to extend in a direction substantially orthogonal to the axial direction of the first casing, and is connected to the second casing. The exhaust gas is purified by reducing NOx using ammonia generated by the injection of the urea water.

CITATION LIST

Patent Literature

Patent Literature 1: Japanese Unexamined Patent Publication No. 2009-228484

SUMMARY OF INVENTION

Technical Problem

Although the purifying efficiency of the exhaust gas can be increased by increasing the injection amount of the reducing agent, there is a problem in that running cost increases with the increase in the injection amount of the reducing agent. To increase the purifying efficiency of the exhaust gas without increasing the injection amount of the reducing agent, it is conceivable to increase the diffusion efficiency of the reducing agent injected into the pipe.

As a way to increase the diffusion efficiency of the reducing agent injected into the pipe, it is conceivable to increase the flow velocity of the exhaust gas flowing into the pipe. However, since the first casing of the exhaust purification device described in Patent Literature 1 has a constant diameter from the upstream side to the downstream side, there is a limit in the increase in the flow velocity of the exhaust gas flowing into the pipe.

Hence, one aspect of the present invention has been made in view of the above-described circumstances, and it is an object thereof to provide an exhaust purification device that can increase the flow velocity of the exhaust gas flowing into the pipe so as to sufficiently diffuse the reducing agent.

Solution to Problem

An exhaust purification device for purifying exhaust gas according to one aspect of the present invention is an exhaust purification device for purifying exhaust gas flowing in an exhaust gas flow passage of an engine and includes a cylindrical casing, a pipe that is disposed on a downstream side of the casing and inserted in the casing so as to extend in a direction substantially orthogonal to an axial direction of the casing, the pipe being provided with a through-hole communicating with the casing, and an injector configured to inject a reducing agent from an upstream end of the pipe into the pipe. In the exhaust gas flow passage in the casing, a contracting flow passage portion narrowing in an axial direction of the pipe from an upstream side toward the downstream side is formed.

As an embodiment of the present invention, the through-hole may be formed at a part in the pipe axial direction of an inserted portion of the pipe in the casing, and the contracting flow passage portion may narrow toward the through-hole.

As another embodiment of the present invention, the contracting flow passage portion may be formed by an inner wall surface of the casing.

As still another embodiment of the present invention, at least a part of the contracting flow passage portion may be formed by a baffle plate mounted on an inner wall surface of the casing.

As still another embodiment of the present invention, the exhaust purification device may further include a swirling baffle plate configured to guides the exhaust gas to the through-hole so as to generate a swirl flow in the pipe.

Advantageous Effects of Invention

According to one aspect of the present invention, the flow velocity of exhaust gas flowing into a pipe is increased so that a reducing agent can be sufficiently diffused.

DESCRIPTION OF EMBODIMENTS

Hereinafter, exhaust purification devices according to embodiments of the present invention will be described in detail with reference to the drawings. In the following description, the same reference signs will be given to the same or equivalent elements, and duplicate description thereof will be omitted.

First Embodiment

Figure 1:
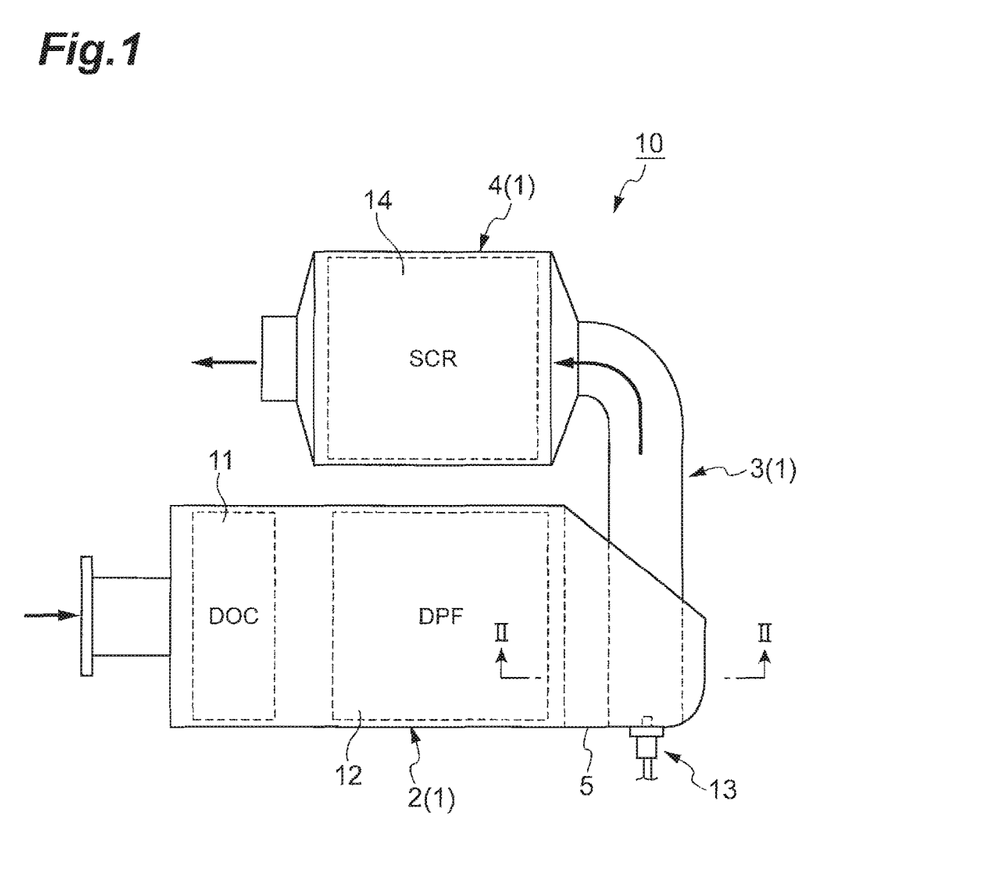
FIG. 1 is a diagram illustrating a schematic configuration of an exhaust purification device according to a first embodiment of the present invention.

FIG. 1 is a diagram illustrating a schematic configuration of an exhaust purification device according to a first embodiment of the present invention. As illustrated in FIG. 1, an exhaust purification device 10 of the present embodiment purifies, for example, exhaust gas exhausted from an engine, such as a diesel engine, in a vehicle, such as a truck (hereinafter simply called "exhaust gas"). The exhaust purification device 10 is mounted in an exhaust gas flow passage 1 through which the exhaust gas flows, and includes a DOC 11, a DPF 12, an injector 13, and an SCR 14.

The exhaust gas flow passage 1 is defined at least by a first casing 2, a pipe (wall) 3, and a second casing 4, which are arranged in this order from the upstream side to the downstream side. The first casing 2 and the second casing 4 are substantially cylindrically formed, and are arranged side by side so that flows of the exhaust gas therein are substantially parallel to each other. The pipe 3 connects the downstream side of the first casing 2 to the upstream side of the second casing 4. The pipe 3 extends straight in a direction orthogonal to the longitudinal direction of the first casing 2, and thereafter extends so as to bend toward the upstream side of the second casing 4.

The DOC 11 oxidizes unburned fuel in the exhaust gas, and is provided on the upstream side in the first casing 2. The DPF 12 collects particulates in the exhaust gas that has passed through the DOC 11. The DPF 12 is provided on the downstream side of the DOC 11 in the first casing 2.

The injector 13 injects the reducing agent to add it to the exhaust gas immediately after passing through the DPF 12. By injecting urea water as the reducing agent, the injector 13 here causes a thermal decomposition reaction and a hydrolysis reaction represented by the following formulae (1) to produce ammonia.

$$(NH_2)_2CO \rightarrow NH_3 + HNCO \text{(thermal decomposition reaction)}$$

$$HNCO + H_2O \rightarrow NH_3 + CO_2 \text{(hydrolysis reaction)} \quad (1)$$

The SCR 14 purifies the exhaust gas by causing a selective reduction reaction of NOx in the exhaust gas using the added reducing agent. The SCR 14 is provided in the second casing 4. Using the generated ammonia, the SCR 14 here causes the reduction reaction represented by the following formulae (2) to selectively reductively purify NOx. The subsequent stage of the second casing 4 includes an ammonia reducing catalyst (not illustrated) that oxidizes surplus ammonia.

$$4NO + 4NH_3 + O_2 \rightarrow 4N_2 + 6H_2O \text{(standard)}$$

$$6NO_2 + 8NH_3 \rightarrow 7N_2 + 12H_2O \text{(slow)}$$

$$NO + NO_2 + 2NH_3 \rightarrow 2N_2 + 3H_2O \text{(fast)} \quad (2)$$

Figure 2:
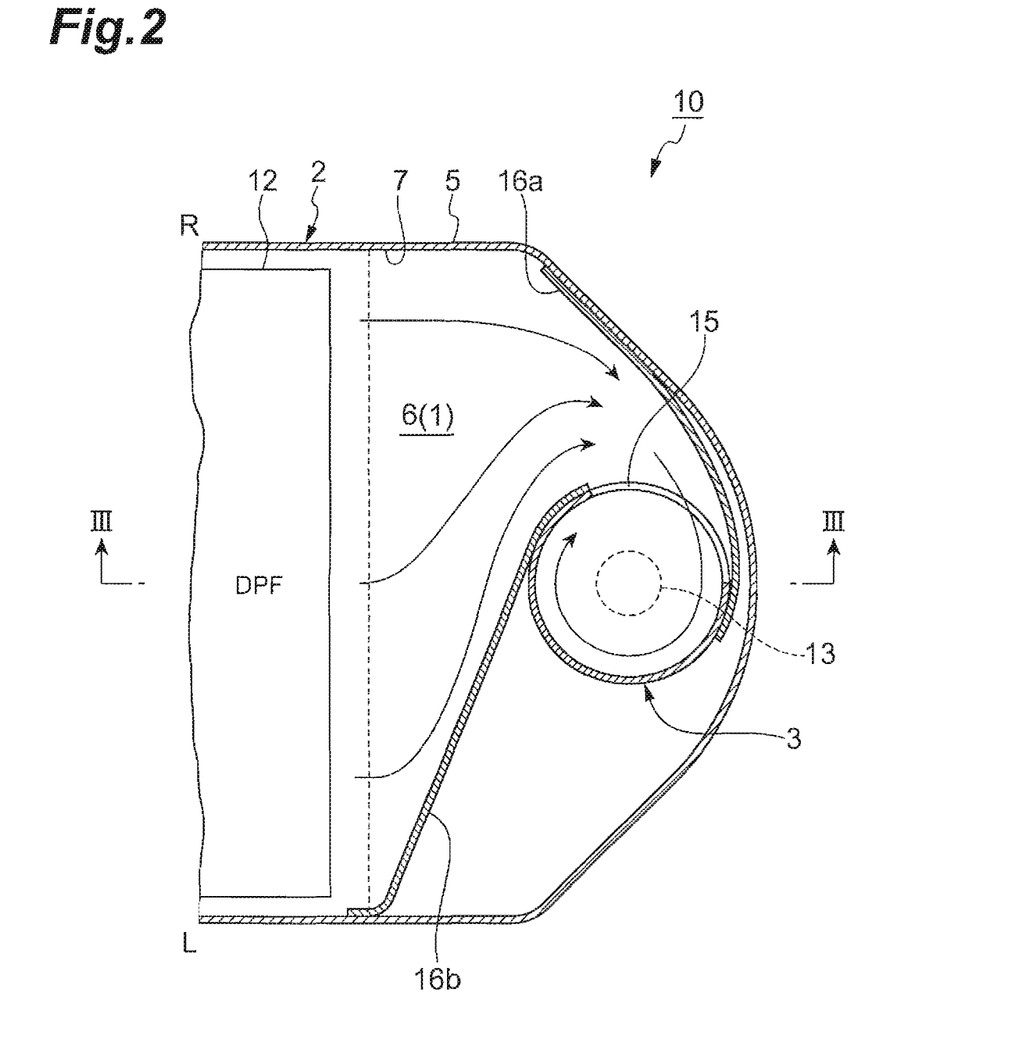
FIG. 2 is a schematic sectional view illustrating an essential part of the exhaust purification device illustrated in FIG. 1, the view taken along line II-II in FIG. 1.
Figure 3:
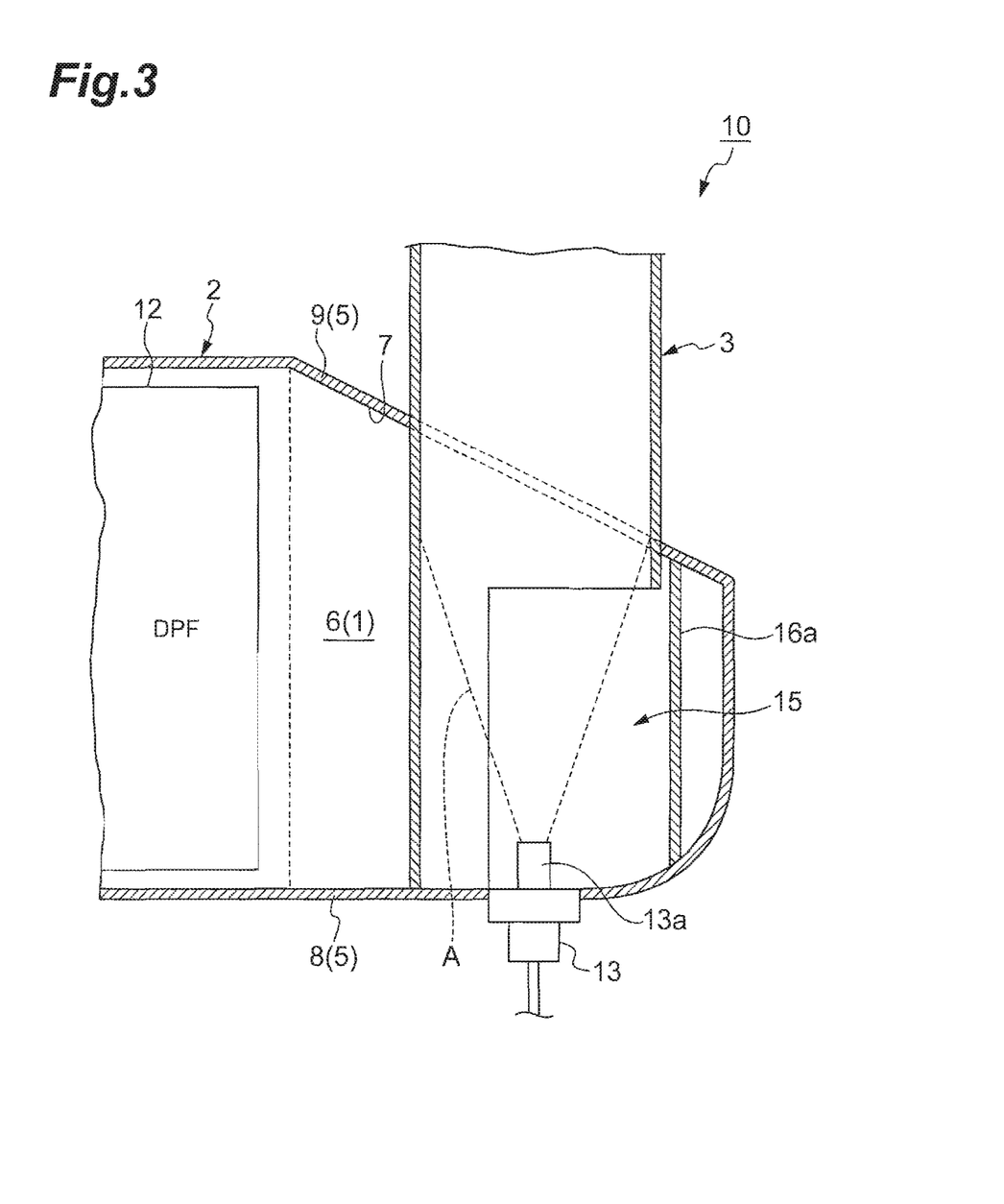
FIG. 3 is a schematic sectional view illustrating the essential part of the exhaust purification device illustrated in FIG. 1, the view taken along line III-III in FIG. 2.

The following describes in detail an essential part of the exhaust purification device 10, using FIGS. 2 and 3. FIG. 2 is a schematic sectional view illustrating the essential part of the exhaust purification device illustrated in FIG. 1, the view taken along line II-II in FIG. 1. FIG. 3 is a schematic sectional view illustrating the essential part of the exhaust purification device illustrated in FIG. 1, the view taken along line III-III in FIG. 2. For convenience, the upper side of FIG. 2 will be referred to as the right side; the lower side of FIG. 2 as the left side; the upper side of FIG. 3 as the upper side; and the lower side of FIG. 3 as the lower side.

As illustrated in FIGS. 2 and 3, the upstream side of the pipe 3 is inserted in the downstream side of the DPF 12 in the first casing 2. The upstream side of the pipe 3 inserted in the first casing 2 extends in a direction substantially orthogonal to the axial direction of the first casing 2 so that the flow of the exhaust gas is orthogonal to the first casing 2. An open end on the upstream side of the pipe 3 is blocked by a wall surface of the first casing 2. The axial direction of the first casing 2 refers to the right-left direction in FIGS. 2 and 3.

The injector 13 is mounted on the upstream end of the pipe 3 so that the reducing agent is injected along the pipe 3 axial direction from the upstream end of the pipe 3. The pipe 3 axial direction refers to the up-down direction in FIG. 3. The injector 13 injects the reducing agent into the pipe 3. In other words, the pipe 3 encloses therein an injection area A of the reducing agent injected from the injector 13. A nozzle 13a of the injector 13 here is located on the center axis of the pipe 3. The injector 13 injects the reducing agent toward the downstream side from the center axis position of the pipe 3 serving as a source point of the injection.

A through-hole 15 allowing the exhaust gas to flow in is formed on the upstream side of the pipe 3 inserted in the first casing 2. The through-hole 15 is a rectangular through-hole penetrating between the inside and the outside of the pipe 3.

As illustrated in FIG. 2, the through-hole 15 is formed on the left side (upper side in FIG. 2) of the pipe 3. A baffle plate 16a and a baffle plate 16b for guiding the exhaust gas to the through-hole 15 are mounted in the first casing 2 so as to cover a space between the first casing 2 and the pipe 3. The baffle plate 16a is a baffle plate for guiding the exhaust gas that has flowed from the left side of the first casing 2 to the right side of the pipe 3. The baffle plate 16b is a swirling baffle plate for guiding the exhaust gas that has flowed to the right side of the pipe 3 from a direction tangential to the pipe 3 to the through-hole 15 so as to generate a swirl flow in the pipe 3.

As illustrated in FIG. 3, the through-hole 15 is formed at a part in the pipe 3 axial direction of an inserted portion of the pipe 3 in the first casing 2. To be specific, the through-hole 15 is formed on the upstream side of a position where the injection area A of the reducing agent injected from the injector 13 overlaps an inner wall surface of the pipe 3. That is to say, the through-hole 15 is formed only on the upstream side of the portion of the pipe 3 inserted in the first casing 2, and is not formed on the downstream side of the inserted portion. The injection area A has a silhouette of a substantially conical shape with the injector 13 serving as the apex. The injection area A can be geometrically obtained based on, for example, an injection angle of the reducing agent injected from the injector 13.

A downstream end portion 5 serving as a downstream portion of the first casing 2 forms a contracting flow passage portion 6 in which the exhaust gas flow passage 1 in the first casing 2 narrows in the pipe 3 axial direction from the upstream side toward the downstream side.

The downstream end portion 5 is a portion on the downstream side of a position between the DPF 12 and the pipe 3 in the first casing 2. Any position between the DPF 12 and the pipe 3 can be set as a position on the upstream side of the downstream end portion 5 in the axial direction of the first casing 2. For example, from the viewpoint of reducing the pressure loss of the exhaust gas, a position on the DPF 12 side of the central point between the DPF 12 and the pipe 3 can be set as the position on the upstream side of the downstream end portion 5. The downstream end portion 5 is formed into a deformed cylinder shape obtained by pressing the upper portion of the first casing 2 so as to be flattened along a chord a circle. That is to say, the downstream end portion 5 is formed of a circular arc wall portion 8 formed to have a circular arc-shaped section having an opening on the upper side thereof, and of a chord wall portion 9 formed to have a chord-shaped section closing the opening on the upper side of the circular arc wall portion 8. The chord wall portion 9 is inclined downward (downward in FIG. 3) toward the downstream side, and the downstream end of the chord wall portion 9 is located in the vicinity of the upper end of the through-hole 15 in the pipe 3 axial direction. The vicinity of the upper end of the through-hole 15 refers to a range from a position slightly below the upper end of the through-hole 15 to a position slightly above the upper end of the through-hole 15. The downstream end of the chord wall portion 9 need not, however, be located in the vicinity of the upper end of the through-hole 15. The chord wall portion 9 may extend toward the downstream side either in a straight line or in a curved line.

The contracting flow passage portion 6 is formed by an inner wall surface 7 of the downstream end portion 5 serving as the first casing 2. As a result, the contracting flow passage portion 6 is formed on the downstream side of the position between the DPF 12 and the pipe 3, and narrows in the pipe 3 axial direction from the upstream side toward the downstream side. The chord wall portion 9 is inclined downward toward the downstream side, and the downstream end of the chord wall portion 9 is located in the vicinity of the upper end of the through-hole 15 in the pipe 3 axial direction, so that the contracting flow passage portion 6 narrows from the upstream side toward the through-hole 15.

In the exhaust purification device 10 configured as described above, as illustrated in FIG. 1, in the first casing 2, the exhaust gas from the engine is oxidized by the DOC 11, and then, the particulates in the exhaust gas are collected by the DPF 12. After passing through the DPF 12, the exhaust gas flows into the contracting flow passage portion 6, and is guided by the baffle plates 16a and 16b to flow into the pipe 3 from the through-hole 15, as illustrated in FIGS. 2 and 3.

In more detail, as illustrated in FIG. 2, the exhaust gas flowing on the left side in the first casing 2 is guided to the right side in the first casing 2 by the baffle plate 16a. The exhaust gas flowing on the right side in the first casing 2 and the exhaust gas guided to the right side in the first casing 2 by the baffle plate 16a are guided from the direction tangential to the pipe 3 to the through-hole 15 by the baffle plate 16b. As a result, the exhaust gas that has flowed through the through-hole 15 into the pipe 3 swirls clockwise in the view taken in the direction of injection of the injector 13.

As illustrated in FIG. 3, the contracting flow passage portion 6 narrows in the pipe 3 axial direction from the upstream side toward the downstream side. As a result, the exhaust gas that has passed through the DPF 12 contracts in the pipe 3 axial direction and increases in flow velocity while flowing in the contracting flow passage portion 6. The exhaust gas accelerated by passing through the contracting flow passage portion 6 flows into the pipe 3 from the through-hole 15. As a result, the swirl velocity of the exhaust gas that has flowed in from the through-hole 15 increases in the pipe 3.

In the pipe 3, the reducing agent is injected from the injector 13 into the swirl flow of the exhaust gas to be added thereto, and ammonia is produced by the thermal decomposition reaction and the hydrolysis reaction. Thereafter, as illustrated in FIG. 1, the exhaust gas containing the ammonia is fed into the second casing 4, and NOx in the exhaust gas is selectively reduced by the SCR 14, so that the exhaust gas is purified. Then, the exhaust gas is fed to the ammonia reducing catalyst at the subsequent stage.

As described above, with the present embodiment, the exhaust gas flowing in the first casing 2 flows into the pipe 3 through the through-hole 15 of the pipe 3. At this point, the exhaust gas flow passage 1 narrows in the contracting flow passage portion 6. Due to this, the exhaust gas flowing in the first casing 2 contracts in the pipe 3 axial direction and increases in flow velocity as the exhaust gas flows from the upstream side toward the downstream side. This increases the flow velocity of the exhaust gas flowing into the pipe 3, so that the diffusion efficiency of the reducing agent injected into the pipe 3 can be increased. As a result, the purifying efficiency of the exhaust gas can be increased without increasing the injection amount of the reducing agent.

Since the through-hole 15 is formed at a part in the axial direction of the pipe 3, narrowing the contracting flow passage portion 6 toward the through-hole 15 enables the smooth guiding of the exhaust gas to the through-hole 15. As a result, the pressure loss of the exhaust gas decreases, so that the flow velocity of the exhaust gas flowing into the pipe 3 can further increase.

The contracting flow passage portion 6 is formed by the inner wall surface 7 of the first casing 2, so that the first casing 2 can be smaller than in the case in which the contracting flow passage portion 6 is absent. As a result, the degree of freedom of layout increases.

Providing the baffle plate 16a can cause the exhaust gas that has flowed into the pipe 3 to generate the swirl flow. Moreover, the contracting flow passage portion 6 provides the effect of accelerating the exhaust gas, so that the stronger swirl flow can be generated in the pipe 3. As a result, the diffusion efficiency of the reducing agent injected into the pipe 3 can further increase.

Second Embodiment

The following describes a second embodiment of the present invention. The second embodiment is basically the same as the first embodiment, and differs therefrom only in the shapes of the first casing and the pipe. Hence, the following describes only points different from those of the first embodiment, and omits the same description as that of the first embodiment.

Figure 4:
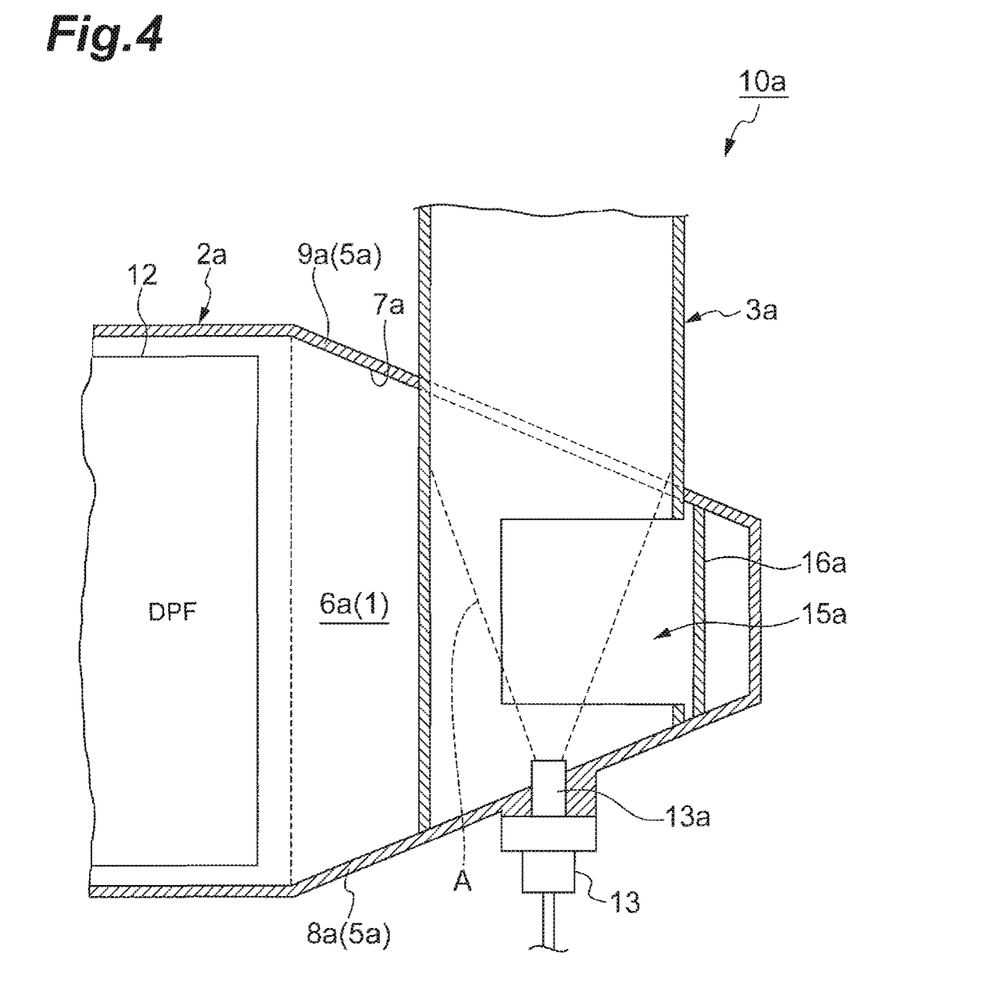
FIG. 4 is a schematic sectional view corresponding to FIG. 3, but illustrating an essential part of an exhaust purification device according to a second embodiment of the present invention.

FIG. 4 is a schematic sectional view corresponding to FIG. 3, but illustrating an essential part of an exhaust purification device according to the second embodiment. As illustrated in FIG. 4, an exhaust purification device 10a according to the second embodiment includes a first casing 2a instead of the first casing 2, and also includes a pipe 3a instead of the pipe 3.

The pipe 3a is basically the same as the pipe 3 of the first embodiment, and has a through-hole 15a formed therein that corresponds to the through-hole 15 of the first embodiment.

The through-hole 15a is formed at a part in the pipe 3a axial direction of an inserted portion of the pipe 3a in the first casing 2a. To be specific, the through-hole 15a is formed only at a part of the pipe 3a corresponding to a middle portion of the first casing 2a in the pipe 3a axial direction, and is not formed at parts of the pipe 3a corresponding to lower and upper portions of the first casing 2a in the pipe 3a axial direction.

The first casing 2a is basically the same as the first casing 2 of the first embodiment. However, instead of the downstream end portion 5 of the first embodiment, a downstream end portion 5a is formed in the first casing 2a. The downstream end portion 5a forms a contracting flow passage portion 6a in which the exhaust gas flow passage 1 in the first casing 2a narrows in the pipe 3a axial direction from the upstream side toward the downstream side.

The downstream end portion 5a is a portion on the downstream side of a position between the DPF 12 and the pipe 3a in the first casing 2a. Any position between the DPF 12 and the pipe 3a can be set as a position on the upstream side of the downstream end portion 5a in the axial direction of the first casing 2a. For example, from the viewpoint of reducing the pressure loss of the exhaust gas, a position on the DPF 12 side of the central point between the DPF 12 and the pipe 3a can be set as the position on the upstream side of the downstream end portion 5a. The downstream end portion 5a is formed into a deformed cylinder shape obtained by pressing the upper and lower portions of the first casing 2a so as to be flattened along chords of a circle. That is to say, the downstream end portion 5a is formed of circular arc wall portions (not illustrated) formed to have a pair of circular arc-shaped sections having openings on the upper and lower sides thereof, a lower chord wall portion 8a formed to have a chord-shaped section closing one of the openings on the upper side of the circular arc wall portions, and an upper chord wall portion 9a formed to have a chord-shaped section closing the other of the openings on the lower side of the circular arc wall portions. The lower chord wall portion 8a is inclined upward (upward in FIG. 4) toward the downstream side, and the downstream end of the lower chord wall portion 8a is located in the vicinity of the lower end of the through-hole 15a in the pipe 3a axial direction. The upper chord wall portion 9a is inclined downward (downward in FIG. 4) toward the downstream side, and the downstream end of the upper chord wall portion 9a is located in the vicinity of the upper end of the through-hole 15a in the pipe 3a axial direction. The downstream ends of the lower and the upper chord wall portions 8a and 9a need not, however, be located in the vicinities of the lower and the upper ends of the through-hole 15a. Each of the lower and the upper chord wall portions 8a and 9a may extend toward the downstream side either in a straight line or in a curved line.

The contracting flow passage portion 6a is formed by an inner wall surface 7a of the downstream end portion 5a serving as the first casing 2a. As a result, the contracting flow passage portion 6a is formed on the downstream side of the position between the DPF 12 and the pipe 3a, and narrows in the pipe 3a axial direction from the upstream side toward the downstream side. The lower chord wall portion 8a is inclined upward toward the downstream side. The downstream end of the lower chord wall portion 8a is located in the vicinity of the lower end of the through-hole 15a in the pipe 3a axial direction. The upper chord wall portion 9a is inclined downward toward the downstream side. The downstream end of the upper chord wall portion 9a is located in the vicinity of the upper end of the through-hole 15a in the pipe 3a axial direction. As a result, the contracting flow passage portion 6a narrows from the upstream side toward the through-hole 15a.

In this manner, even if the through-hole 15a is formed only at the part of the pipe 3a corresponding to the middle portion of the first casing 2a in the pipe 3a axial direction, the contracting flow passage portion 6a narrowing in the pipe 3a axial direction from the upstream side toward the downstream side is formed. Since the contracting flow passage portion 6a narrows toward the through-hole 15a, the same operational advantage as that of the first embodiment is obtained.

Third Embodiment

The following describes a third embodiment of the present invention. The third embodiment is basically the same as the first embodiment, and differs therefrom only in the shapes of the first casing and the pipe. Hence, the following describes only points different from those of the first embodiment, and omits the same description as that of the first embodiment.

Figure 5:
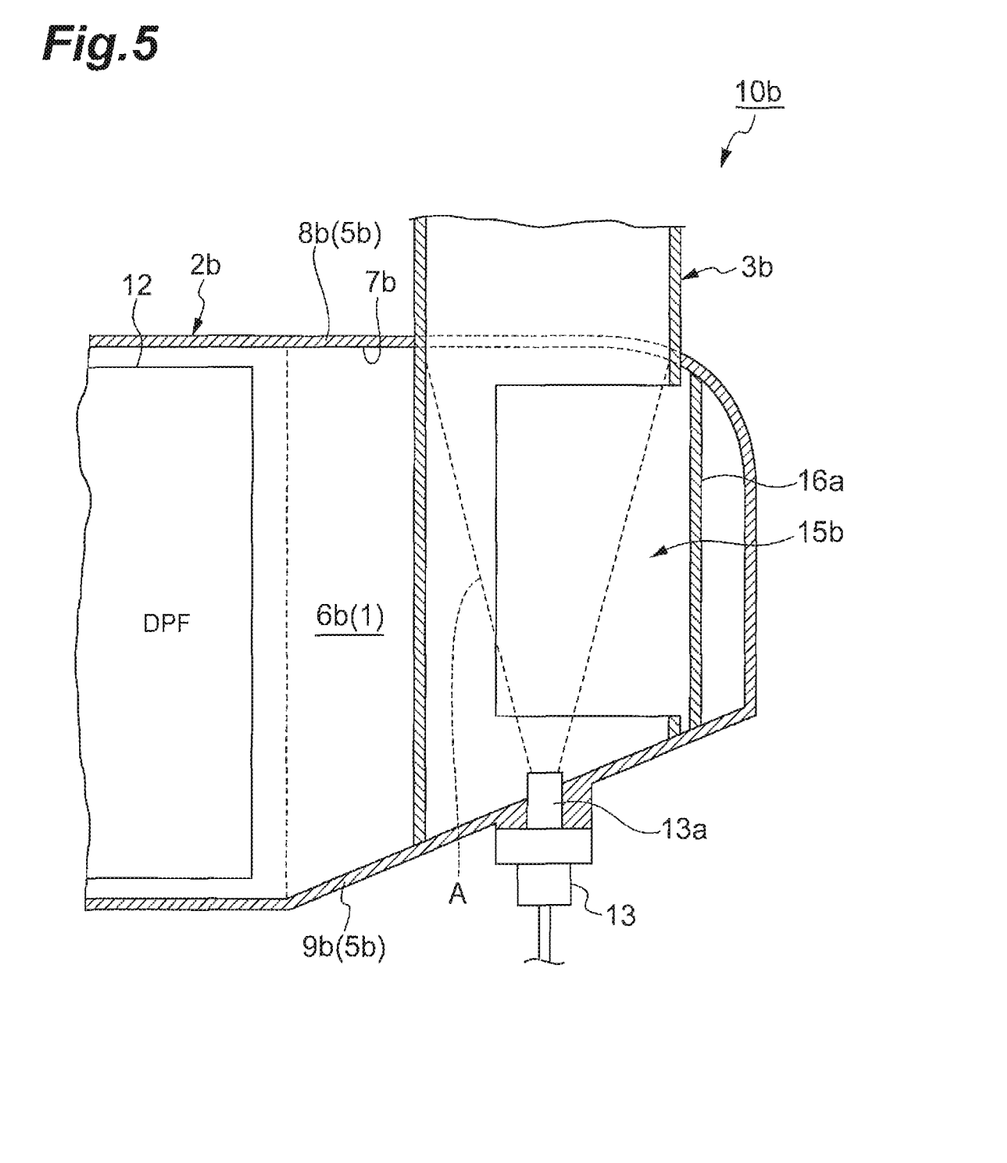
FIG. 5 is a schematic sectional view corresponding to FIG. 3, but illustrating an essential part of an exhaust purification device according to a third embodiment of the present invention.

FIG. 5 is a schematic sectional view corresponding to FIG. 3, but illustrating an essential part of an exhaust purification device according to the third embodiment. As illustrated in FIG. 5, an exhaust purification device 10b according to the third embodiment includes a first casing 2b instead of the first casing 2, and also includes a pipe 3b instead of the pipe 3.

The pipe 3b is basically the same as the pipe 3 of the first embodiment, and has a through-hole 15b formed therein that corresponds to the through-hole 15 of the first embodiment.

The through-hole 15b is formed at a part in the pipe 3b axial direction of an inserted portion of the pipe 3b in the first casing 2b. To be specific, the through-hole 15b is formed only at a part of the pipe 3b corresponding to an upper portion of the first casing 2b in the pipe 3b axial direction, and is not formed at a part of the pipe 3b corresponding to a lower portion of the first casing 2b in the pipe 3b axial direction.

The first casing 2b is basically the same as the first casing 2 of the first embodiment. However, instead of the downstream end portion 5 of the first embodiment, a downstream end portion 5b is formed in the first casing 2b. The downstream end portion 5b forms a contracting flow passage portion 6b in which the exhaust gas flow passage 1 in the first casing 2b narrows in the pipe 3b axial direction from the upstream side toward the downstream side.

The downstream end portion 5b is a portion on the downstream side of a position between the DPF 12 and the pipe 3b in the first casing 2b. Any position between the DPF 12 and the pipe 3b can be set as an end on the upstream side of the downstream end portion 5b in the axial direction of the first casing 2b. For example, from the viewpoint of reducing the pressure loss of the exhaust gas, a position on the DPF 12 side of the central point between the DPF 12 and the pipe 3b can be set as the end on the upstream side of the downstream end portion 5b. The downstream end portion 5b is formed into a deformed cylinder shape obtained by pressing the lower portion of the first casing 2b so as to be flattened along a chord a circle. That is to say, the downstream end portion 5b is formed of a circular arc wall portion 8b formed to have a circular arc-shaped section having an opening on the lower side thereof, and of a lower chord wall portion 9b formed to have a chord-shaped section closing the opening on the lower side of the circular arc wall portion 8b. The lower chord wall portion 9b is inclined upward (upward in FIG. 5) toward the downstream side, and the downstream end of the lower chord wall portion 9b is located in the vicinity of the lower end of the through-hole 15b in the pipe 3b axial direction. The downstream end of the lower chord wall portion 9b need not, however, be located in the vicinity of the lower end of the through-hole 15b. The lower chord wall portion 9b may extend toward the downstream side either in a straight line or in a curved line.

The contracting flow passage portion 6b is formed by an inner wall surface 7b of the downstream end portion 5b serving as the first casing 2b. As a result, the contracting flow passage portion 6b is formed on the downstream side of the position between the DPF 12 and the pipe 3b, and narrows in the pipe 3b axial direction from the upstream side toward the downstream side. The lower chord wall portion 9b is inclined upward toward the downstream side, and the downstream end of the lower chord wall portion 9b is located in the vicinity of the lower end of the through-hole 15b in the pipe 3b axial direction. As a result, the contracting flow passage portion 6b narrows from the upstream side toward the through-hole 15b.

In this manner, even if the through-hole 15b is formed only at the part of the pipe 3b corresponding to an upper portion of the first casing 2b in the pipe 3b axial direction, the contracting flow passage portion 6b narrowing in the pipe 3b axial direction from the upstream side toward the downstream side is formed. Since the contracting flow passage portion 6b narrows toward the through-hole 15b, the same operational advantage as that of the first embodiment is obtained.

Fourth Embodiment

The following describes a fourth embodiment of the present invention. The fourth embodiment is basically the same as the first embodiment, and differs therefrom only in that the first casing is different. Hence, the following describes only points different from those of the first embodiment, and omits the same description as that of the first embodiment.

Figure 6:
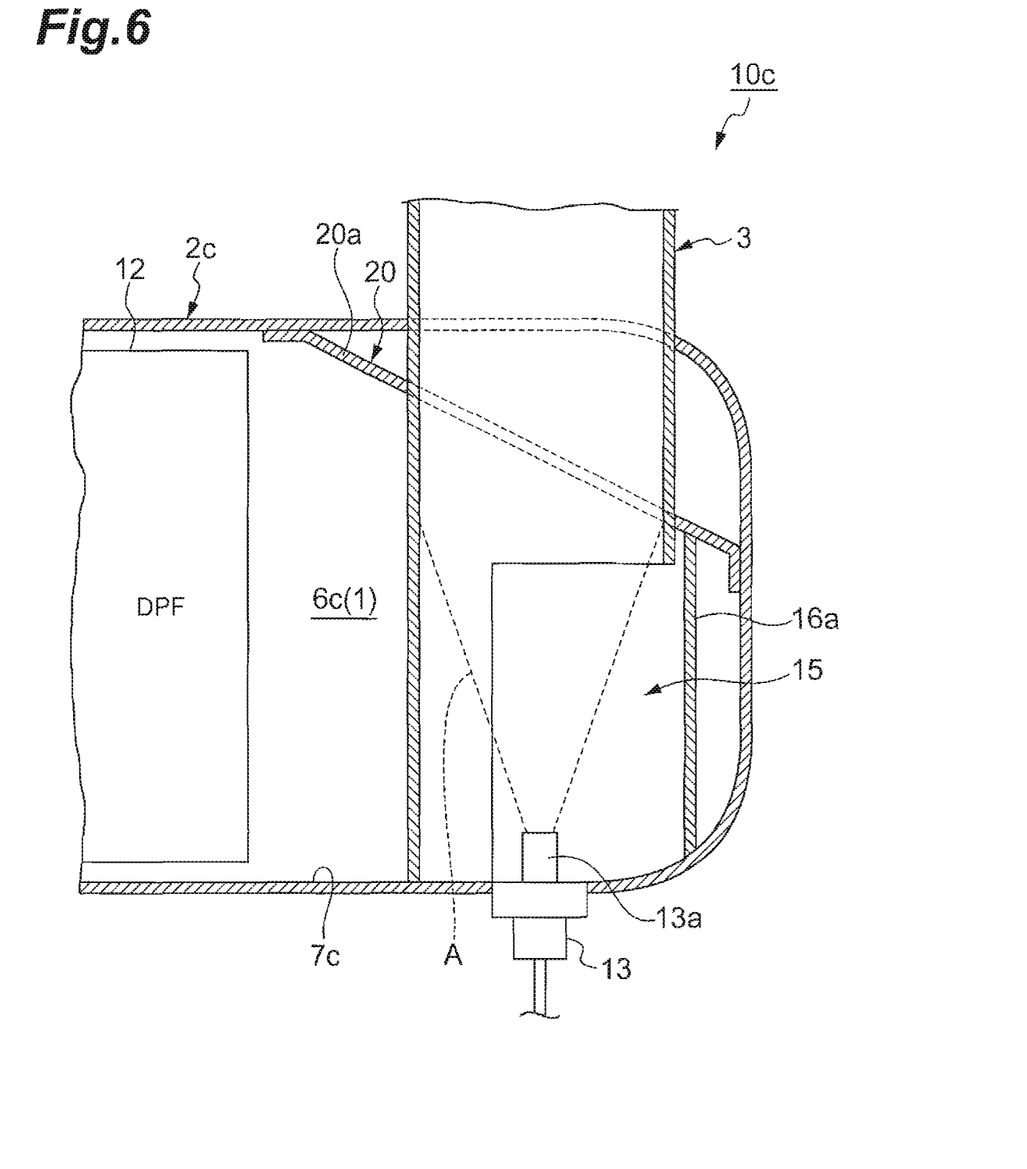
FIG. 6 is a schematic sectional view corresponding to FIG. 2, but illustrating an essential part of an exhaust purification device according to a fourth embodiment of the present invention.

FIG. 6 is a schematic sectional view corresponding to FIG. 3, but illustrating an essential part of an exhaust purification device according to the fourth embodiment. As illustrated in FIG. 6, an exhaust purification device 10c according to the fourth embodiment includes a first casing 2c instead of the first casing 2.

The first casing 2c is basically the same as the first casing 2 of the first embodiment. However, the downstream end portion 5 of the first embodiment is not formed as a part of the first casing 2c, but a baffle plate 20 is mounted in the first casing 2c.

The baffle plate 20 forms, in the first casing 2c, a contracting flow passage portion 6c in which the exhaust gas flow passage 1 in the first casing 2a narrows in the pipe 3a axial direction from the upstream side toward the downstream side.

The baffle plate 20 is mounted on an inner wall surface 7c of the first casing 2c. The baffle plate 20 partitions the internal space of the first casing 2c into upper and lower spaces, and is inclined downward from a position between the DPF 12 and the pipe 3a toward the downstream side. Any position between the DPF 12 and the pipe 3 can be set as an end on the upstream side of the baffle plate 20 in the axial direction of the first casing 2c. For example, from the viewpoint of reducing the pressure loss of the exhaust gas, a position on the DPF 12 side of the central point between the DPF 12 and the pipe 3 can be set as the end on the upstream side of the baffle plate 20. An end on the downstream side of an inclined portion 20a of the baffle plate 20 is located in the vicinity of the upper end of the through-hole 15 in the pipe 3 axial direction. The position at the downstream end of the inclined portion 20a of the baffle plate 20 need not, however, be located in the vicinity of the upper end of the through-hole 15.

The contracting flow passage portion 6c is formed by the inner wall surface 7c of the first casing 2c and the baffle plate 20. As a result, the contracting flow passage portion 6c is formed on the downstream side of the position between the DPF 12 and the pipe 3, and narrows in the pipe 3 axial direction from the upstream side toward the downstream side. The baffle plate 20 is inclined downward toward the downstream side, and the downstream end of the baffle plate 20 is located in the vicinity of the upper end of the through-hole 15 in the pipe 3 axial direction. As a result, the contracting flow passage portion 6c narrows from the upstream side toward the through-hole 15.

In this manner, also by forming a part of the contracting flow passage portion 6c with the baffle plate 20, the contracting flow passage portion 6c can have the same shape as that of the contracting flow passage portion 6 according to the first embodiment. Hence, also in the third embodiment, the contracting flow passage portion 6c narrowing in the pipe 3 axial direction from the upstream side toward the downstream side is formed. Since the contracting flow passage portion 6c narrows toward the through-hole 15, the same operational advantage as that of the first embodiment is obtained.

Moreover, the contracting flow passage portion 6c can be formed by the baffle plate 20 regardless of the shape of the first casing 2c.

While the preferred embodiments of the present invention have been described above, the present invention, is not limited to the embodiments described above, and may be modified within the scope not changing the gist described in the claims, or may be applied to other embodiments.

Figure 7:
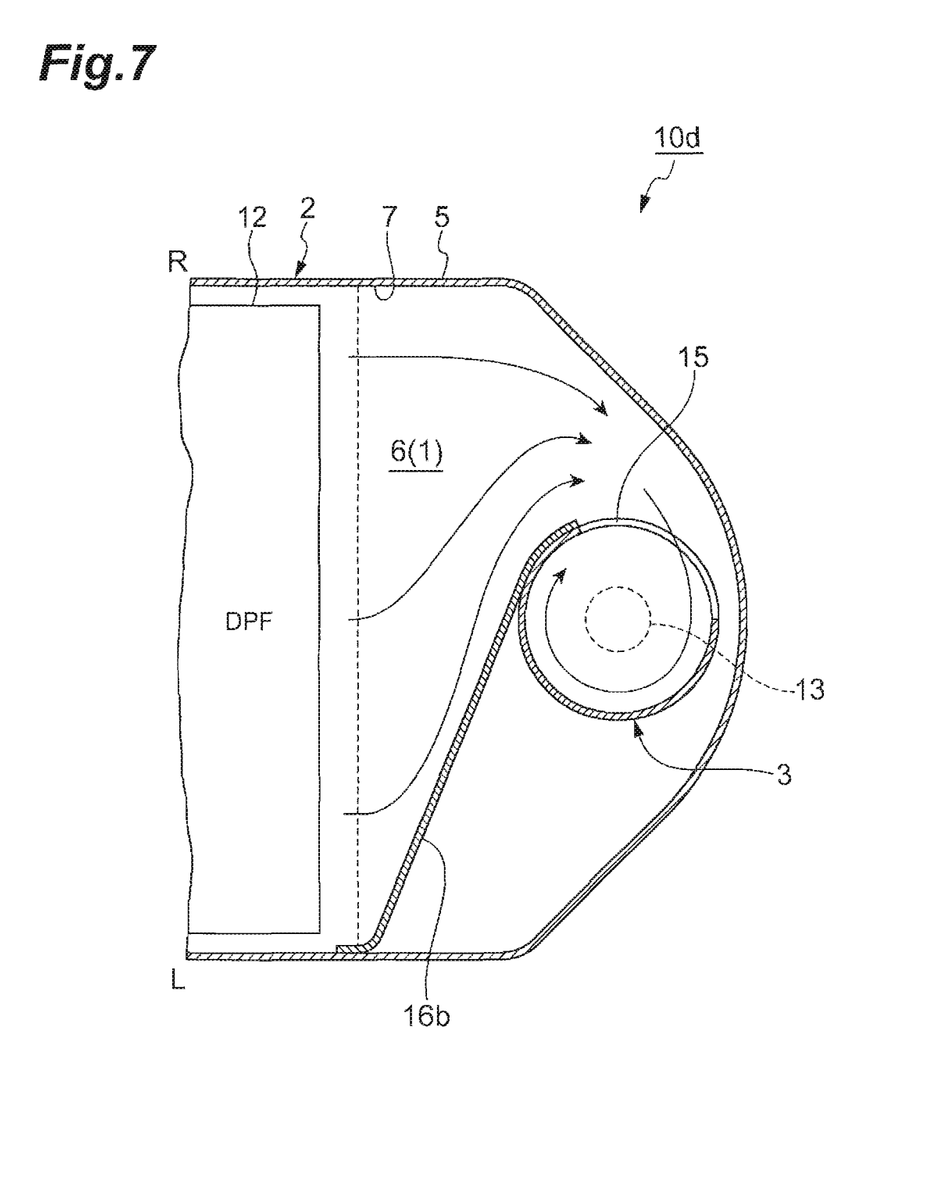
FIG. 7 is a schematic sectional view corresponding to FIG. 2, but illustrating an essential part of an exhaust purification device according to a modification.

For example, in the embodiments described above, the description has been made on the assumption that the swirling baffle plate is provided to guide the exhaust gas to the through-hole so as to generate the swirl flow in the pipe. The swirling baffle plate need not, however, be provided, such as in the case of an exhaust purification device 10d illustrated in FIG. 7. Although the exhaust purification device 10d illustrated in FIG. 7 does not include the swirling baffle plate, the flow velocity of the exhaust gas is increased by the contracting flow passage portion 6. As a result, the flow velocity of the exhaust gas flowing through the through-hole 15 into the pipe 3 increases even though the exhaust gas flows into a gap between the pipe 3 and the first casing 2.

Figure 8:
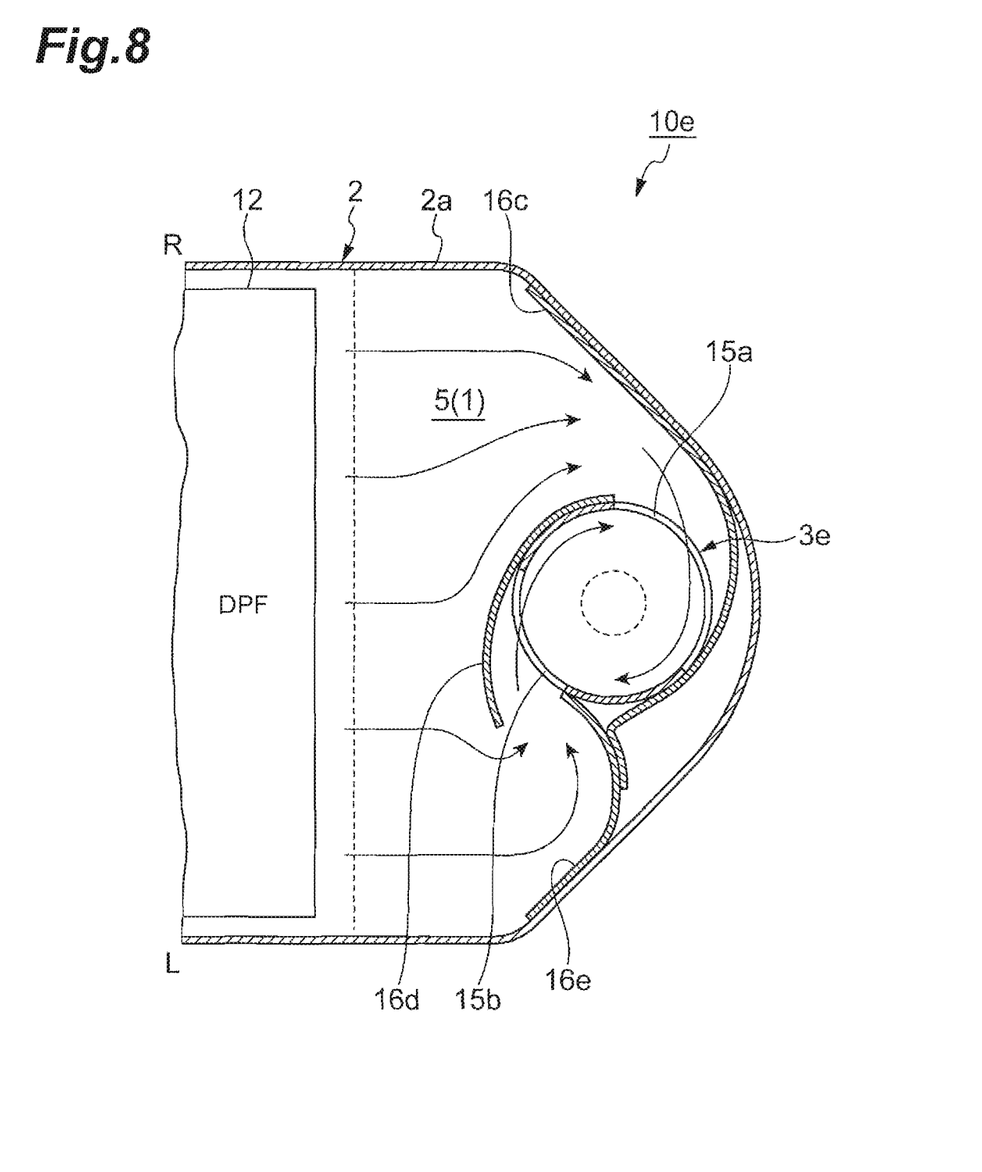
FIG. 8 is a schematic sectional view corresponding to FIG. 3, but illustrating an essential part of an exhaust purification device according to another modification.
Figure 9:
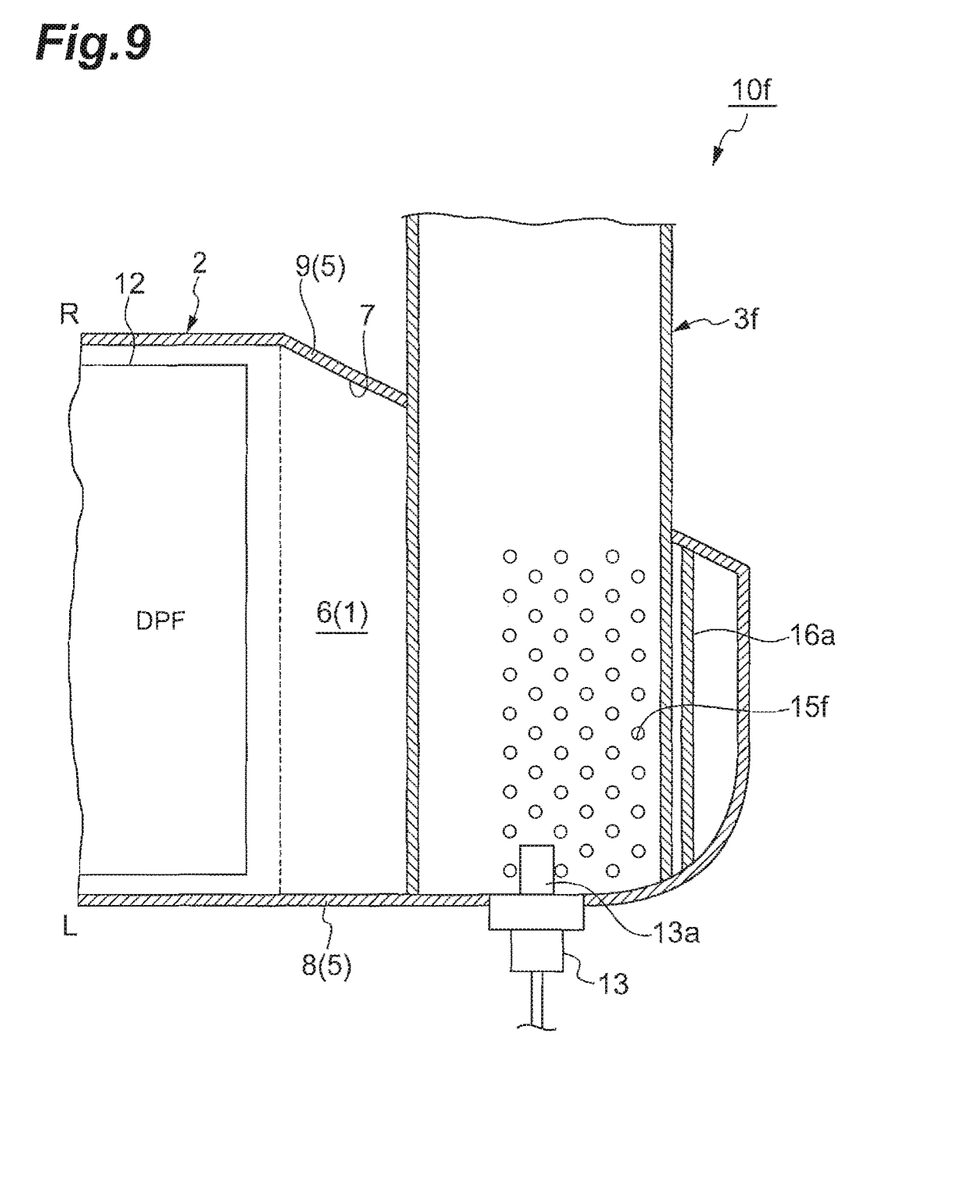
FIG. 9 is a schematic sectional view corresponding to FIG. 3, but illustrating an essential part of an exhaust purification device according to still another modification.

In the embodiments described above, the description has been made on the assumption that the pipe has only one through-hole. However, two or more through-holes may be formed in the pipe. For example, in an exhaust purification device 10e illustrated in FIG. 8, two through-holes 15d and 15e are formed in a pipe 3e. In this case, for example, three baffle plates, that is, a baffle plate 16c for guiding the exhaust gas to the through-hole 15d and baffle plates 16d and 16e for guiding the exhaust gas to the through-hole 15e can be provided. As another example, in an exhaust purification device 10f illustrated in FIG. 9, a plurality of small through-holes 15f are formed in the position of the through-hole 15 according to the first embodiment. The through-holes 15f can be formed by, for example, punching a pipe 3f.

In the fourth embodiment, the description has been made on the assumption that the contracting flow passage portion is formed by the inner wall surface of the first casing and the baffle plate. The contracting flow passage portion may, however, be formed by only baffle plates mounted on the inner wall surface of the first casing.

The embodiments described above can be combined with one another. For example, in the fourth embodiment, the baffle plate 20 may be disposed in each of the positions of the lower and the upper chord wall portions 8a and 9a according to the second embodiment, or may be disposed in the position of the lower chord wall portion 9b according to the third embodiment.

In the embodiments described above, the truck is exemplified as the vehicle. The example may, however, be a bus, a tractor, or another vehicle. In the above description, the term "substantially" is intended to allow errors in manufacturing and design.

REFERENCE SIGNS LIST

1 . . . Exhaust gas flow passage, 2 (2a, 2b, 2c) . . . First casing, 3 (3a, 3b, 3e, 3f) . . . Pipe, 4 . . . Second casing, 5 (5a, 5b) . . . Downstream end portion, 6 (6a, 6b, 6c) . . . Contracting flow passage portion, 7 (7a, 7b, 7c) . . . Inner wall surface, 8 . . . Circular arc wall portion, 8a . . . Lower chord wall portion, 8b . . . Circular arc wall portion, 9 . . . Chord wall portion, 9a . . . Upper chord wall portion, 9b . . . Lower chord wall portion, 10 (10a, 10b, 10c, 10d, 10e, 10f) . . . Exhaust purification device, 11 . . . DOC, 12 . . . DPF, 13 . . . Injector, 13a . . . Nozzle, 14 . . . SCR, 15 (15a, 15b, 15d, 15e, 15f) . . . Through-hole, 16a, 16c, 16d, 16e . . . Baffle plate (swirling baffle plate), 16b . . . Baffle plate, 20 . . . Baffle plate, 20a . . . Inclined portion, A . . . Injection area.

The invention claimed is:

1. An exhaust purification device for purifying exhaust gas flowing in an exhaust gas flow passage of an engine, the exhaust purification device comprising:
a cylindrical casing;
a pipe that is disposed on a downstream side of the casing and inserted in the casing so as to extend in a direction substantially orthogonal to an axial direction of the casing, the pipe being provided with a through-hole communicating with the casing;
an injector configured to inject a reducing agent from an upstream end of the pipe into the pipe; and
a baffle plate that forms a contracting flow passage portion that narrows in an axial direction of the pipe from an upstream side toward the downstream side, the baffle plate extending from an inner wall surface of the casing to an outer surface of the pipe to direct the exhaust gas in the contracting flow passage to the through-hole, the baffle plate surrounds and contacts the pipe downstream of the hole in an axial direction of the pipe, the pipe extending through both the baffle plate and the casing.

2. The exhaust purification device according to claim 1, wherein
the through-hole is formed at a part in the pipe axial direction of an inserted portion of the pipe in the casing, and the contracting flow passage portion narrows toward the through-hole.

3. The exhaust purification device according to claim 1, further comprising a swirling baffle plate configured to guide the exhaust gas to the through-hole so as to generate a swirl flow in the pipe.

4. The exhaust purification device according to claim 3, wherein
the swirling baffle plate extends from the inner wall surface of the casing to the outer surface of the pipe, and
the swirling baffle plate contacts the pipe at a position downstream in the casing from a position where the baffle plate contacts the pipe.

5. The exhaust purification device according to claim 1, wherein
the baffle plate extends from a bottom portion of the inner wall surface of the casing.

6. The exhaust purification device according to claim 1, wherein the baffle plate contacts the outer surface of the pipe upstream of the through-hole in the axial direction of the casing.

7. The exhaust purification device according to claim 1, wherein the casing is narrowed in an axial direction of the pipe from an upstream side toward the downstream side at the contracting flow passage.

8. An exhaust purification device for purifying exhaust gas flowing in an exhaust gas flow passage of an engine, the exhaust purification device comprising:
a cylindrical casing;
a pipe that is disposed on a downstream side of the casing and inserted in the casing so as to extend in a direction substantially orthogonal to an axial direction of the casing, the pipe being provided with a through-hole communicating with the casing;
an injector configured to inject a reducing agent from an upstream end of the pipe into the pipe; and
a baffle plate that forms a contracting flow passage portion that narrows in an axial direction of the pipe from an upstream side toward the downstream side, the baffle plate extending from an inner wall surface of the casing to an outer surface of the pipe to direct the exhaust gas in the contracting flow passage to the through-hole,
wherein the casing includes an upper wall portion inclined downward toward the downstream side and a lower wall portion inclined upward toward the downstream side.

9. The exhaust purification device according to claim 8, wherein a downstream end of the upper wall portion is located at an upper end of the through-hole and a downstream end of the lower wall portion is located at a lower end of the through-hole.

10. The exhaust purification device according to claim 1, wherein
the baffle plate covers a space between the casing and the pipe, and
the pipe extends through the space.

* * * * *